(12) United States Patent
Kim et al.

(10) Patent No.: US 7,939,197 B2
(45) Date of Patent: May 10, 2011

(54) ELECTRODE PLATE FOR RECHARGEABLE BATTERY AND METHOD FOR FABRICATING THE SAME

(75) Inventors: Jong Ku Kim, Cheonan-si (KR); Akihiko Saito, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 12/778,571

(22) Filed: May 12, 2010

(65) Prior Publication Data

US 2010/0233535 A1    Sep. 16, 2010

Related U.S. Application Data

(62) Division of application No. 11/189,727, filed on Jul. 27, 2005, now Pat. No. 7,740,667.

(30) Foreign Application Priority Data

Jul. 28, 2004  (KR) .............................. 2004-0059428
Oct. 26, 2004  (KR) .............................. 2004-0085693

(51) Int. Cl.
*H01M 4/02*  (2006.01)
*H01M 6/00*  (2006.01)
*H01M 4/04*  (2006.01)
*H01M 4/82*  (2006.01)
*H01M 10/16*  (2006.01)

(52) U.S. Cl. ....... 429/209; 429/128; 429/208; 29/623.1; 29/623.3; 29/623.5

(58) Field of Classification Search ...... 29/623.1–623.5; 429/59, 94, 164, 206–211, 231.1–231.95, 429/246; 144/251.2–253.5

See application file for complete search history.

(56) References Cited

U.S. PATENT DOCUMENTS

| | | | |
|---|---|---|---|
| 4,606,982 A | 8/1986 | Nelson et al. | |
| 5,388,975 A | 2/1995 | Proksa et al. | |
| 5,616,152 A | 4/1997 | Velasquez et al. | |
| 6,360,798 B1 | 3/2002 | Apolinski | |
| 6,551,737 B1 | 4/2003 | Takee | |
| 2002/0005162 A1 | 1/2002 | Kokaji et al. | |

FOREIGN PATENT DOCUMENTS

EP    0614237    9/1994

(Continued)

OTHER PUBLICATIONS

Notice of Allowance dated Feb. 23, 2010 in U.S. Appl. No. 11/189,727.

(Continued)

*Primary Examiner* — Dah-Wei D. Yuan
*Assistant Examiner* — Claire L (Rademaker) Roe
(74) *Attorney, Agent, or Firm* — H.C. Park & Associates, PLC (57) ABSTRACT

An electrode plate of a rechargeable battery that is capable of preventing wastage of a base film and preventing an active material layer from being irregularly formed and a method for fabricating the same is disclosed. The electrode plate is fabricated by continuously coating the active material layer lengthwise along a surface of the base film and cutting the base film in a direction substantially perpendicular to a length of the base film or in a direction that forms a predetermined angle in relation to the length of the base film. The method includes forming an active material layer lengthwise on a base film except for on predetermined parts of both ends of the base film by continuously coating active materials, and forming an electrode plate by cutting the base film formed with the active material layer in a direction substantially perpendicular to the length of the base film using a cutter.

2 Claims, 5 Drawing Sheets

FOREIGN PATENT DOCUMENTS

| | | |
|---|---|---|
| JP | 59-083342 | 5/1984 |
| JP | 7-183033 | 7/1995 |
| JP | 08146141 | 6/1996 |
| JP | 09-219189 | 8/1997 |
| JP | 10-055799 | 2/1998 |
| JP | 10-214616 | 8/1998 |
| JP | 11-185734 | 7/1999 |
| JP | 11-329398 | 11/1999 |
| JP | 2002-75334 | 3/2002 |
| JP | 2002-352798 | 12/2002 |
| KR | 2002-0089716 | 11/2002 |
| KR | 2004-0058921 | 7/2004 |
| WO | 01/39293 | 5/2001 |

OTHER PUBLICATIONS

Non-Final Office Action dated Aug. 6, 2009 in U.S. Appl. No. 11/189,727.
Advisory Action dated Jun. 23, 2009 in U.S. Appl. No. 11/189,727.
Final Office Action dated Apr. 16, 2009 in U.S. Appl. No. 11/189,727.
Non-Final Office Action dated Oct. 9, 2008 in U.S. Appl. No. 11/189,727.
Advisory Action dated Jul. 28, 2008 in U.S. Appl. No. 11/189,727.
Final Office Action dated May 15, 2008 in U.S. Appl. No. 11/189,727.
Non-Final Office Action dated Nov. 13, 2007 in U.S. Appl. No. 11/189,727.
Non-Final Office Action dated Apr. 12, 2007 in U.S. Appl. No. 11/189,727.
IPDL Machine English Translation and Abstract of JP 07-183033, date unknown.
IPDL Machine English Translation and Abstract of JP 09219189, date unknown.
English Abstract of JP 08-146141, date unknown; English Machine Translation of JP 08-146141 published Jun. 7, 1996.
English Abstract of JP 2002-075334, date unknown; English Machine Translation of JP 2002-075334 published Mar. 15, 2002.

ELECTRODE PLATE FOR RECHARGEABLE BATTERY AND METHOD FOR FABRICATING THE SAME

CROSS REFERENCE TO RELATED APPLICATIONS

This application is a divisional of U.S. patent application Ser. No. 11/189,727 filed Jul. 27, 2005 and claims priority to and the benefit of Korean Patent Application No. 2004-0059428 filed on Jul. 28, 2004 and Korean Patent Application No. 2004-0085693 filed on Oct. 26, 2004, which are hereby incorporated by reference for all purposes as if fully set forth herein.

BACKGROUND OF THE INVENTION

1. Field of the Invention

The present invention relates to an electrode plate of a rechargeable battery and a method for fabricating the same. In particular, the present invention relates to an electrode plate of a rechargeable battery that is capable of preventing wastage of a base film and preventing an active material layer from being irregularly formed and a method of fabricating the same.

2. Description of the Background

Recently, various portable electronic devices that are compact and lightweight such as cellular phones, notebook computers, and camcorders have been actively developed and manufactured. Such portable electronic devices are equipped with a battery pack so that a user can use the device without a separate power source. The battery pack may include at least one battery that is capable of outputting a predetermined voltage to drive the device for a predetermined period of time.

A rechargeable battery is currently provided in the battery pack for economic reasons. Rechargeable batteries include a nickel-cadmium (Ni—Cd) battery, a nickel-metal hydride (Ni-MH) battery, and a lithium rechargeable battery such as a lithium battery and a lithium-ion battery.

A lithium rechargeable battery has a drive voltage of 3.6 V or more, which is about three times higher than that of a nickel-cadmium battery or a nickel-metal hydride battery. Further, a lithium rechargeable battery has a relatively high energy density per unit mass, so it has widely been used around the world.

A lithium rechargeable battery uses lithium-based oxides as cathode active materials and carbonaceous materials as anode active materials. Generally, lithium rechargeable batteries are classified into liquid electrolyte-based batteries and polymer electrolyte-based batteries. Batteries that use a liquid electrolyte are referred to as lithium ion batteries and batteries that use a polymer electrolyte are referred to as lithium polymer batteries. In addition, the lithium rechargeable batteries are classified into cylindrical lithium rechargeable batteries, square type lithium rechargeable batteries, and pouch type lithium rechargeable batteries depending on their external appearances.

Conventionally, the lithium rechargeable battery includes an electrode assembly that has a cathode plate that is coated with cathode active materials, an anode plate that is coated with anode active materials, and a separator that is interposed between the cathode plate and the anode plate to prevent a short-circuit and to allow only lithium ions to move. In addition, the battery has a case for receiving the electrode assembly therein and an electrolyte that is injected into the case to allow the lithium ions to flow.

The cathode plate that is coated with cathode active materials and is coupled with a cathode tab is stacked on the anode plate that is coated with anode active materials and is coupled with an anode tab. Then, the separator is interposed between the cathode plate and the anode plate. The cathode plate, the anode plate, and the separator are then wound, thereby forming the electrode assembly.

The electrode assembly is housed in a battery case to prevent it from being separated from the case and the electrolyte is injected into the case. Then, the case is sealed to form the lithium rechargeable battery.

Hereinafter, a conventional method for fabricating an electrode plate of a rechargeable battery will be described with reference to FIG. 1A and FIG. 1B.

Figure 1A:
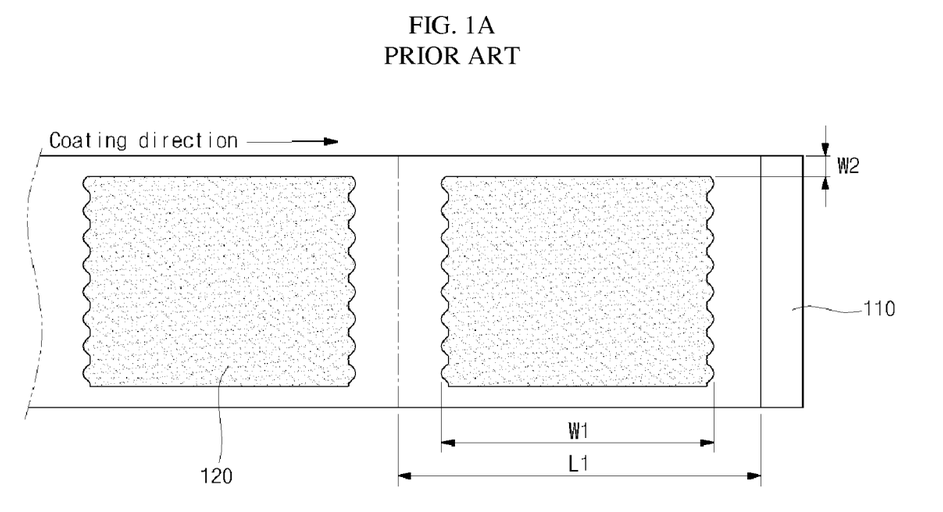
FIG. 1A and FIG. 1B describe a conventional method for fabricating an electrode plate of a rechargeable battery.

As shown in FIG. 1A, a base film 110 for a cathode current collector or an anode current collector is prepared. Cathode active materials or anode active materials are coated lengthwise along a surface of the base film 110 to form an active material layer 120. The active material layer 120 has a predetermined width W1 within a predetermined length L1 of the electrode plate and is coated over the whole area of the base film 110 except for predetermined widths W2 of the base film 110 defined at both side ends of the base film 110.

Figure 1B:
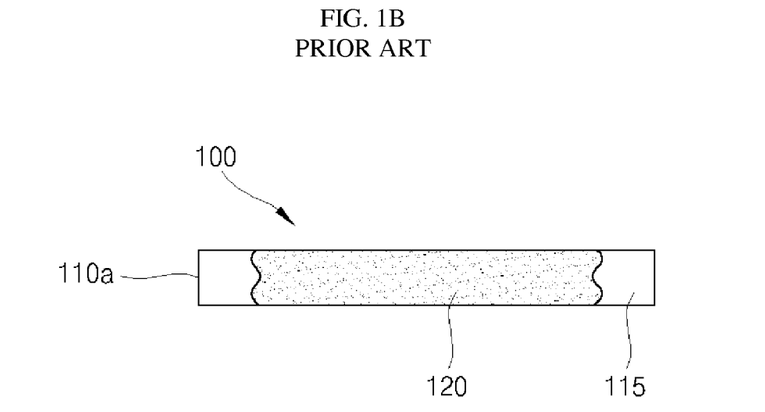

As shown in FIG. 1B, the base film 110 with the active material layer 120 is cut along the length and is then cut along the width within a length unit of the electrode plate 100 of the rechargeable battery using a cutter, thereby forming the electrode plate 100 of the rechargeable battery.

The electrode plate 100 of the rechargeable battery includes a current collector 110a and the active material layer 120 formed on the current collector 110a. In addition, both ends of the electrode plate 100 on which the active material layer 120 is not formed are referred to as uncoated portions 115.

However, in the conventional method of fabricating the electrode plate 100 of the rechargeable battery, the active material layer 120 may be formed on the whole area of the base film 110 except for predetermined widths W2 of the base film 110 that are defined at both ends of the base film 110, unnecessarily wasting the base film 110.

In addition, according to the conventional method for fabricating the electrode plate 100 of the rechargeable battery, the active materials may be coated lengthwise along the base film 110 corresponding to a length of the active material layer 120. This makes it difficult to continuously fabricate the electrode plate 100 of the rechargeable battery and increases the manufacturing time for the electrode plate 100.

Figure 2:
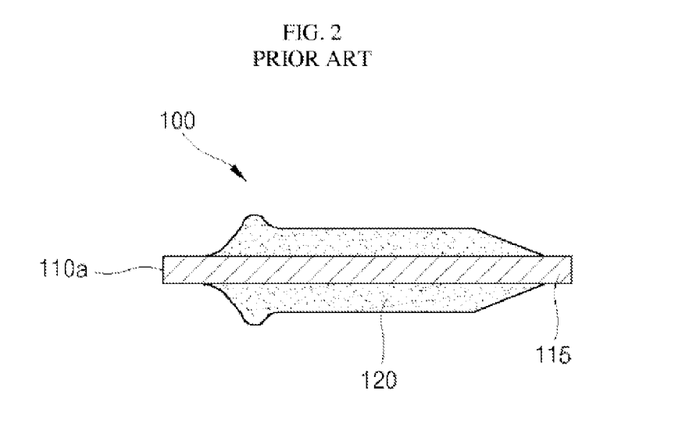
FIG. 2 is a sectional view of an electrode plate of a rechargeable battery.

FIG. 2 is a sectional view of the conventional electrode plate 100 of the rechargeable battery.

As shown in FIG. 2, the active material layer 120 formed on the base film 110 of the conventional electrode plate 100 of the rechargeable battery may have an irregular sectional shape. Since the active material layer 120 extends between uncoated portions 115 of the electrode plate 100, a front part of the active material layer 120 may be bulked and a rear part of the active material layer 120 may be attenuated. Such nonuniformities of the active material layer 120 may deteriorate the stability of the rechargeable battery including the electrode plate 100.

SUMMARY OF THE INVENTION

The present invention provides an electrode plate of a rechargeable battery and a method for fabricating the same that is capable of improving the power storage capacity of the battery, preventing a base film from being wasted, and preventing an active material layer from being irregularly formed while improving the productivity of the electrode plate per unit time. This is achieved by continuously coating the active material layer lengthwise along a surface of the base film and cutting the base film in a direction that forms a predetermined angle in relation to the length of the base film.

Additional features of the invention will be set forth in the description which follows, and in part will be apparent from the description, or may be learned by practice of the invention.

The present invention discloses a method for fabricating an electrode plate of a rechargeable battery comprising forming an active material layer on a base film except for on predetermined parts of both ends of the base film by continuously coating active materials lengthwise along the base film and forming an electrode plate by cutting the base film in a direction perpendicular to a length of the base film.

The present invention also discloses an electrode plate of a rechargeable battery comprising a current collector and an active material layer that is formed on a surface of the current collector, wherein the current collector includes a base film. The active material layer is formed on the base film by continuously coating active materials lengthwise along the base film. The electrode plate is obtained by cutting the base film formed with the active material layer in a direction perpendicular to the length of the base film.

The present invention also discloses a method for fabricating an electrode plate of a rechargeable battery comprising forming an active material layer on a base film except for on predetermined parts of both ends of the base film by continuously coating active materials lengthwise along the base film and forming an electrode plate by cutting the base film formed with the active material layer in a direction forming an angle of more than 0° and less than 90° in relation to the length of the base film.

The present invention also discloses an electrode plate of a rechargeable battery comprising a current collector having four edges, in which one of four edges is formed with an acute angle of more than 0° and less than 90° and an active material layer formed on at least one surface of the current collector with a predetermined width.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

The present invention describes a method for fabricating an electrode plate of a rechargeable battery that reduces wastage of a base film and prevents an active material layer from being formed irregularly. It achieves this by continuously coating the active material layer lengthwise along a surface of the base film and then cutting the base film.

Since the active material layer of the present invention is also formed through a continuous process, the process time can be shortened so that productivity of the electrode plate per unit time may improve. In addition, the electrode plate of the present invention has a relatively long length so the capacity of the rechargeable battery having the electrode plate may increase.

Figure 3:
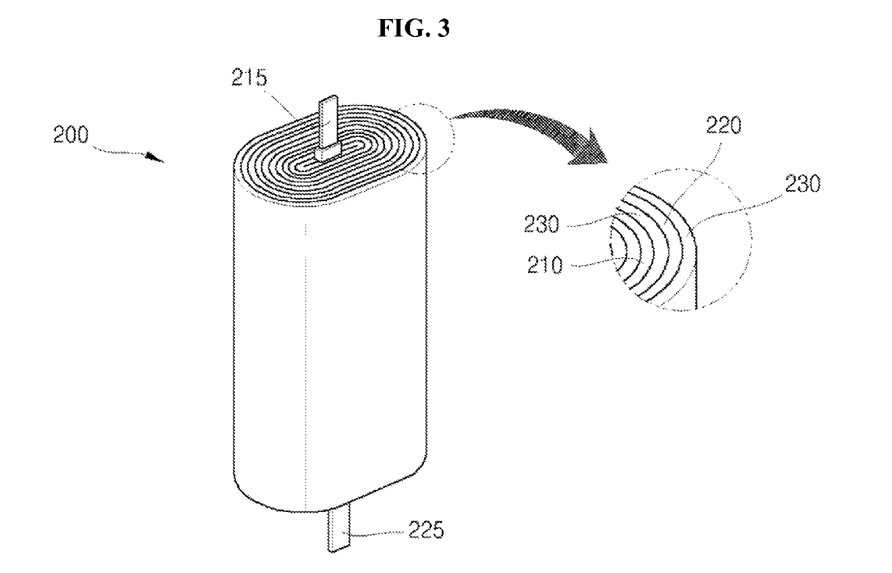
FIG. 3 is a perspective view of an electrode assembly having an electrode plate that is fabricated through a method of the present invention.

FIG. 3 is a perspective view of an electrode assembly 200 having an electrode plate that is fabricated by a method of the present invention.

Referring to FIG. 3, the electrode assembly 200 includes a cathode plate 210 including a cathode current collector that is coated with cathode active materials, an anode plate 220 including an anode current collector that is coated with anode active materials, and a separator 230 that is interposed between the cathode plate 210 and the anode plate 220 to prevent a short-circuit between the cathode plate 210 and the anode plate 220 and to allow lithium ions to flow.

The cathode active materials may include chalcogenide compounds. For example, composite metal oxides may include, but are not limited to $LiCoO_2$, $LiMn_2O_4$, $LiNiO_2$, $LiNi_{1-x}Co_xO_2 (0<x<1)$, or $LiMnO_2$ may be used as cathode active materials. In addition, anode active materials may include carbon-based materials, silicon, tin, tin oxides, composite tin alloys, transition metal oxides, lithium metal nitrides, or lithium metal oxides, for example. In general, the cathode plate 210 may include aluminum, the anode plate 220 may include copper, and the separator 230 may include polyethylene or polypropylene. However, the present invention does not limit materials of the cathode plate 210, the anode plate 220, and the separator 230.

The cathode plate 210 is coupled with a cathode tab 215, which may comprise an aluminum material and protrudes upwards from an upper portion of the cathode plate 210. In addition, the anode plate 220 is coupled with an anode tab 225, which may comprise a nickel material and protrudes downwards from a lower portion of the anode plate 220. However, the present invention does not limit the extending direction and materials of the cathode tab 215 and the anode tab 225.

Figure 4A:
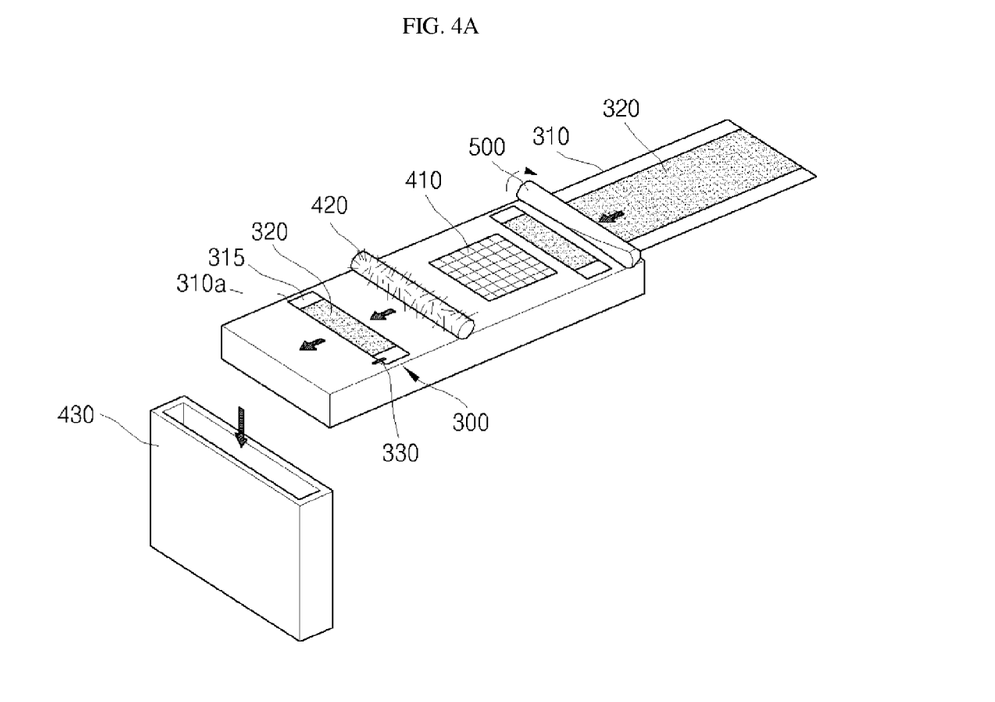
FIG. 4A is a perspective view of a method for fabricating an electrode plate of a rechargeable battery according to an exemplary embodiment of the present invention.
Figure 4B:
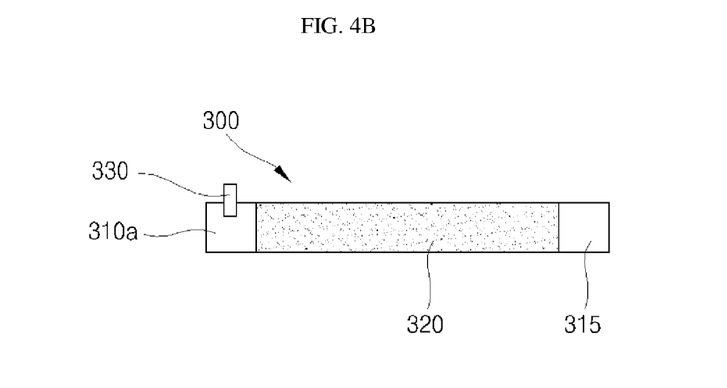
FIG. 4B is a plan view of an electrode plate of a rechargeable battery according to an exemplary embodiment of the present invention.
Figure 4C:
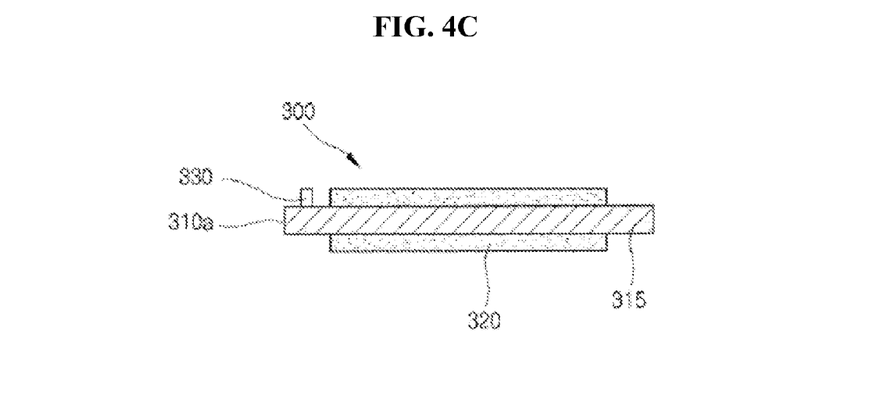
FIG. 4C is a sectional view of an electrode plate of a rechargeable battery according to an exemplary embodiment of the present invention.

FIG. 4A is a perspective view of a method for fabricating an electrode plate 300 of the rechargeable battery according to an exemplary embodiment of the present invention. FIG. 4B is a plan view of the electrode plate 300 of the rechargeable battery according to an exemplary embodiment of the present invention. FIG. 4C is a sectional view of the electrode plate of 300 the rechargeable battery according to an exemplary embodiment of the present invention.

The electrode plate 300 according to an exemplary embodiment of the present invention includes an active material layer 320 that is formed on a current collector 310a so that the active material layer 320 can be symmetrically aligned about a center thereof without creating irregular portions in the active material layer 320.

In addition, the method for fabricating the electrode plate 300 according to an exemplary embodiment of the present invention includes continuously coating the active material layer 320 lengthwise on a surface of a base film 310 and cutting the base film 310 in a direction perpendicular to the length of the base film 310. Thus, the electrode plate 300 of the rechargeable battery may be fabricated while preventing the active material layer 320 from being formed irregularly.

Referring to FIG. 4A, active materials are continuously coated on a surface of the base film 310 except for on predetermined parts of both ends of the base film 310. The active materials are coated lengthwise on a surface of the base film 310, thereby forming the active material layer 320.

The base film 310 with the active material layer 320 is then cut in a direction perpendicular to the coating direction of the active material layer 320, that is, in a direction perpendicular to the length of the base film 310, by a rotary cutter 500. The base film 310 is cut into substantially the same size as the electrode plate 300 of the rechargeable battery. Thus, the electrode plate 300 including the current collector 310a, the active material layer 320 formed on the current collector 310a, and uncoated portions 315 that are provided at both ends of the current collector 310a without the active material layer 320 is formed as shown in FIG. 4B and FIG. 4C.

In addition, since boundary lines that are formed between the uncoated portions 315 and the active material layer 320 are substantially parallel to the coating direction of the active materials, the active material layer 320 may be formed uniformly without creating a bulked portion and an attenuated portion, which may be created when the active material layer is formed by the conventional method. Therefore, the stability of a lithium rechargeable battery can be improved.

Then, burrs that are generated when the base film 310 is cut into the electrode plate 300 of the rechargeable battery by the rotary cutter 500 may be removed using a conveyer mesh 410 and a brush 420. A vacuum is created below the conveyer mesh 410 to remove burrs and impurities, and the brush 420 rotates to remove the burrs.

An electrode tab 330 is then coupled with one of uncoated portions 315 that are formed at both ends of the electrode plate of the rechargeable battery. In general, the electrode tab 330 may be coupled with the uncoated portion 315 by an ultrasonic welding process using aluminum when the electrode plate 300 is a cathode plate or using nickel when the electrode plate 300 is an anode plate. However, the present invention does not limit attachment methods for the electrode tab 330 and materials used for the attachment methods.

Next, the electrode plate 300 that is equipped with the electrode tab 330 is housed in a case 430. When the electrode plate 300 is fabricated by forming the active material layer 320 on the base film 310 by continuously coating active materials lengthwise along the base film 310 and cutting the base film 310 in a direction substantially perpendicular to the length of the base film 310, the active material layer 320 may be symmetrically aligned about the center of the base film 310 as shown in FIG. 4C.

Figure 5A:
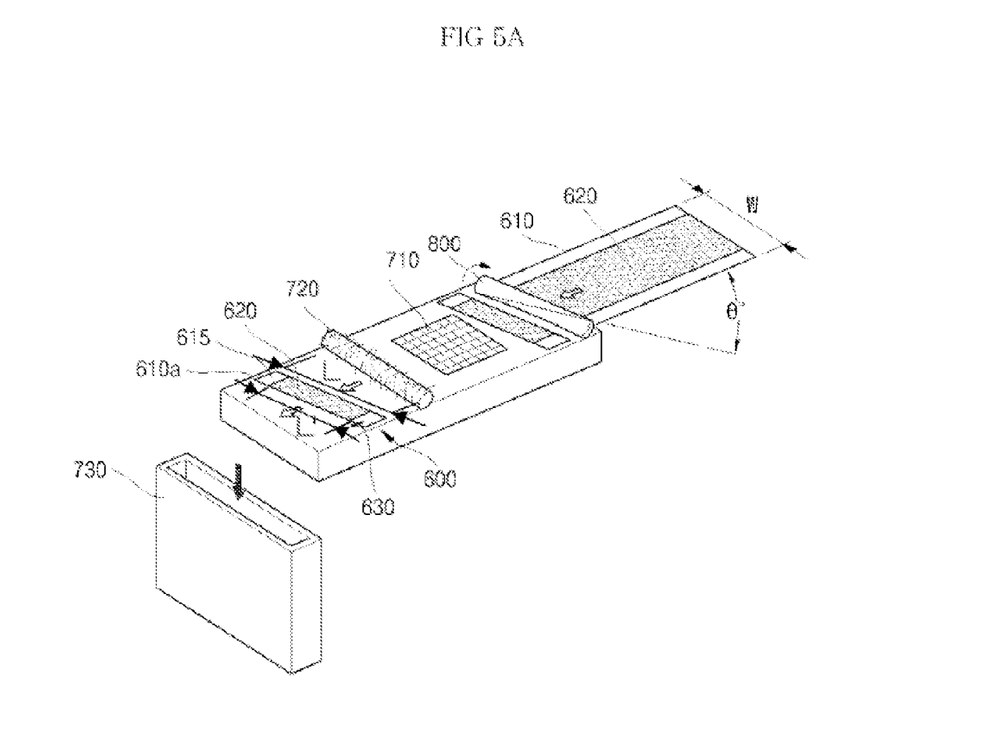
FIG. 5A is a perspective view of a method for fabricating an electrode plate of a rechargeable battery according to another exemplary embodiment of the present invention.
Figure 5B:
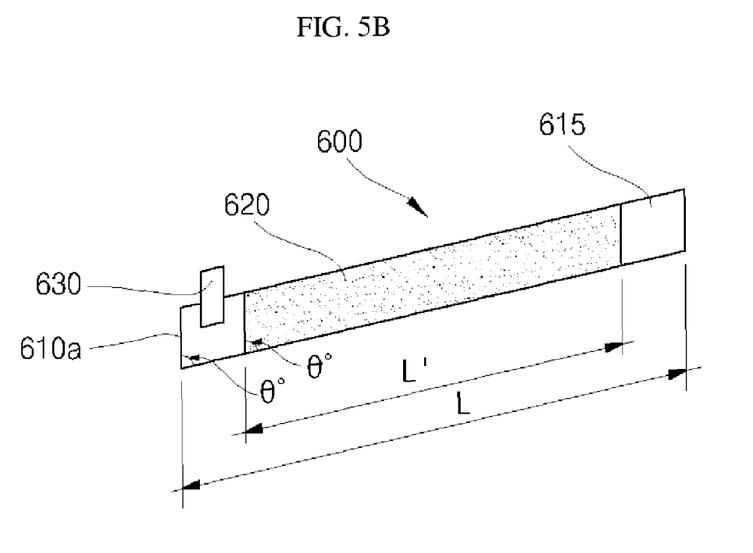
FIG. 5B is a plan view of an electrode plate of a rechargeable battery according to another exemplary embodiment of the present invention.

FIG. 5A is a perspective view of a method for fabricating an electrode plate of a rechargeable battery according to another exemplary embodiment of the present invention. FIG. 5B is a plan view of the electrode plate of the rechargeable battery according to another exemplary embodiment of the present invention.

The method for fabricating the electrode plate of the rechargeable battery shown in FIG. 5A and FIG. 5B is substantially identical to the method for fabricating the electrode plate of the rechargeable battery shown in FIG. 4A, FIG. 4B, and FIG. 4C. However, in this other embodiment, a rotary cutter 800 is aligned at a predetermined angle in relation to a base film 610 that is coated with an active material layer 620.

Referring to FIG. 5A, active materials are continuously coated on a surface of the base film 610 in the form of foil except for predetermined parts on both ends of the base film 610. The active materials are coated lengthwise on a surface of the base film 610 to form the active material layer 620.

The base film 610 that comprises the active material layer 620 is then cut into substantially the same size as the electrode plate 600 of the rechargeable battery by a rotary cutter 800 that is inclined with respect to the base film 610. In particular, the rotary cutter 800 is inclined at a predetermined angle ($\theta$) of more than 0° and less than 90°, with respect to the coating direction of the active materials. Thus, an electrode plate 600 including current collector 610a made from the base film 610, the active material layer 620 formed on the current collector 610a, and uncoated portions 615 that are provided at both ends of the current collector 610a without the active material layer 620 is formed.

Then, burrs that are generated when the base film 610 is cut into the electrode plate 600 by the rotary cutter 800 are removed using a conveyer mesh 710 and a brush 720. A vacuum is created below the conveyer mesh 710 to remove burrs and impurities that are generated during a cutting process by the rotary cutter 800, and the brush 720 rotates to remove the burrs.

An electrode tab 630 is then coupled with one of uncoated portions 615 that are formed at both ends of the electrode plate of the rechargeable battery. Next, the electrode plate 600 equipped with the electrode tab 630 is housed in a case 730.

Referring to FIG. 5B, the electrode plate 600 of the rechargeable battery as shown in FIG. 5A may be obtained by cutting the base film 610 using a rotary cutter 800, which is inclined at a predetermined angle ($\theta$) with respect to the coating direction of the active materials. The angle that is formed between a cutting line of the base film 610 and the length of the base film 610 and is substantially identical to the predetermined angle ($\theta$) formed between the base film 610 and the rotary cutter 800. In addition, the active material layer 620 is aligned substantially parallel to the length of the base film 610.

Accordingly, one of four edges of the current collector 610a or the active material layer 620 of the electrode plate 600 is formed with an acute angle that is substantially identical to the predetermined angle ($\theta$) that is formed between the base film 610 and the rotary cutter 800. That is, preferably, one of four edges of the current collector 610a of the electrode plate 600 is formed with an acute angle (i.e. more than 0° and less than 90°) and one of four edges of the active material layer 620 of the electrode plate 600 is also formed with the acute angle.

In addition, a length L of the electrode plate 600 of the rechargeable battery is determined according to the predetermined angle ($\theta$) that is formed between the base film 610 and the rotary cutter 800 as represented in Equation 1.

$$L = W/\sin\theta \qquad \text{Equation 1}$$

As represented by Equation 1, the length L of the electrode plate 600 of the rechargeable battery is directly proportional to a width W of the base film and inversely proportional to a sine value of the predetermined angle ($\theta$) that is formed between the base film 610 and the rotary cutter 800.

Accordingly, as the predetermined angle ($\theta$) formed between the base film 610 and the rotary cutter 800 decreases, the length L of the electrode plate 600 of the rechargeable battery may increase. Thus, a length L' of the active material layer 620 also increases, so the power storage capacity of the rechargeable battery may improve.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrode plate, comprising:
   a current collector having four edges, in which one of four edges is formed with an angle of more than 0° and less than 90°; and
   an active material layer formed on a surface of the current collector,
   wherein a length of the electrode plate is directly proportional to a width of a base film of the current collector and inversely proportional to a sine value of the angle of an edge of the current collector.

2. The electrode plate of claim 1,
   wherein the active material layer has four edges, in which an edge is formed with an angle of more than 0° and less than 90°.

* * * * *